United States Patent
Chandrasekaran et al.

(10) Patent No.: US 11,941,106 B2
(45) Date of Patent: Mar. 26, 2024

(54) CLIENT DEVICE BASED MANAGEMENT OF MULTIPLE DEVICES WITH SINGLE USER ACCOUNT

(71) Applicant: ARRIS Enterprises LLC, Suwanee, GA (US)

(72) Inventors: Sathish Arumugam Chandrasekaran, Bangalore (IN); Muralidharan Narayanan, Bangalore (IN); David F. Brumbaugh, Collegeville, PA (US); Jalagandeswari Ganapathy, Bangalore (IN)

(73) Assignee: ARRIS ENTERPRISES LLC, Horsham, PA (US)

( * ) Notice: Subject to any disclaimer, the term of this patent is extended or adjusted under 35 U.S.C. 154(b) by 149 days.

(21) Appl. No.: 17/405,344

(22) Filed: Aug. 18, 2021

(65) Prior Publication Data
US 2022/0100843 A1   Mar. 31, 2022

Related U.S. Application Data

(60) Provisional application No. 63/084,831, filed on Sep. 29, 2020.

(51) Int. Cl.
*G06F 21/45* (2013.01)
*H04L 9/08* (2006.01)
(Continued)

(52) U.S. Cl.
CPC ............ *G06F 21/45* (2013.01); *H04L 9/0866* (2013.01); *H04L 9/3226* (2013.01);
(Continued)

(58) Field of Classification Search
CPC ....... G06F 21/45; G06F 21/44; H04L 9/0866; H04L 9/3226; H04L 63/0815; H04L 63/083; H04L 67/01
See application file for complete search history.

(56) References Cited

U.S. PATENT DOCUMENTS

| 2002/0116485 A1* | 8/2002 | Black | H04L 41/344 709/227 |
| 2017/0094706 A1* | 3/2017 | Kim | H04L 67/303 |
| 2021/0216620 A1* | 7/2021 | Ganapathy | G06F 21/41 |

OTHER PUBLICATIONS

International Search Report dated Dec. 8, 2021 in International (PCT) Application No. PCT/US2021/046458.

(Continued)

*Primary Examiner* — Nelson S. Giddins
(74) *Attorney, Agent, or Firm* — Wenderoth, Lind & Ponack, L.L.P.

(57) ABSTRACT

Aspects of the present disclosure are drawn to a client device for use with a first network device, a second network device, an external server, the first network device being configured to communicate with the external server and the second network device being configured to communicate with the external server. The client device includes a memory and a processor configured to execute instructions stored on the memory. This causes the client device to onboard onto the first network device using a first password, generate a key, and store first association information in the external server. The first association information including client device identifying data to uniquely identify the client device. The client device will also onboard the second network device using the first password and store second association information in the external server, the second association information including the client device identifying data, and second network device identifying data to uniquely identify the second network device.

9 Claims, 5 Drawing Sheets

(51) Int. Cl.
*H04L 9/32* (2006.01)
*H04L 9/40* (2022.01)
*H04L 67/01* (2022.01)

(52) U.S. Cl.
CPC ........ *H04L 63/0815* (2013.01); *H04L 63/083* (2013.01); *H04L 67/01* (2022.05)

(56) References Cited

OTHER PUBLICATIONS

International Preliminary Report on Patentability and Written Opinion dated Apr. 13, 2023 in International Application No. PCT/US2021/046458.

* cited by examiner

| | Client ID | Device ID | Key | Encrypted PW | Decrypted PW |
|---|---|---|---|---|---|
| 512 | Client Device 1 | GW 1 | A1skjfa | hUd4@qN | LifeIsCool |
| 514 | | APD 1 | A1skjfa | hUd4@qN | LifeIsCool |
| 516 | | APD 2 | A1skjfa | hUd4@qN | LifeIsCool |
| 518 | | APD 3 | A1skjfa | hUd4@qN | LifeIsCool |
| 520 | Client Device 2 | GW 2 | Ods4ion | Afka6wU% | Br7he#lpX |
| 522 | | APD 4 | Ods4ion | Afka6wU% | Br7he#lpX |
| 524 | | APD 5 | Ods4ion | Afka6wU% | Br7he#lpX |
| 526 | Client Device 3 | GW 3 | 3093s,df | fRt8f73h | IHateUser2 |

FIG. 5

CLIENT DEVICE BASED MANAGEMENT OF MULTIPLE DEVICES WITH SINGLE USER ACCOUNT

BACKGROUND

Embodiments of the present disclosure relate to managing passwords for network devices.

SUMMARY

Aspects of the present disclosure are drawn to a client device for use with a first network device, a second network device, an external server, the first network device being configured to communicate with the external server and the second network device being configured to communicate with the external server. The client device includes a memory and a processor configured to execute instructions stored on the memory. This causes the client device to onboard onto the first network device using a first password, generate a key, and store first association information in the external server. The first association information including client device identifying data to uniquely identify the client device. The client device will also onboard the second network device using the first password and store second association information in the external server, the second association information including the client device identifying data, and second network device identifying data to uniquely identify the second network device.

In some embodiments, the client device, wherein the processor is further configured to execute instructions stored on the memory to cause the client device to generate the key based on client device information of the client device and first network device information of the first network device.

In some embodiments, the client device, wherein the client device identifying data is selected from a group of types of data consisting of an email address of a user of the client device, a phone number of the client device, a MAC address of the client device, and combinations thereof.

Other aspects of the present disclosure are drawn to a method of using a client device with a first network device, a second network device, an external server, the first network device being configured to communicate with the external server, and the second network device being configured to communicate with the external server. The method includes onboarding, via a processor configured to execute instruction stored on a memory onto the first network device using a first password and generating, via the processor, a key. The method further includes encrypting, via the processor, the password using the generated key as well as storing, via the processor, first association information in the external server. The association information including client device identifying data to uniquely identify the client device, first network device identifying data to uniquely identify the first network device, the key and the encrypted password. The method also includes onboarding, via the processor, the second network device using the first password and storing via the processor, second association information in the external server, the second association information including the client device identifying data, and second network device identifying data to uniquely identify the second network device.

In some embodiments, the method, wherein the generating the key includes generating the key based on client device information of the client device and first network device information of the first network device.

In some embodiments, the method, wherein the client device identifying data is selected from a group of types of data consisting of an email address of a user of the client device, a phone number of the client device, a MAC address of the client device, and combinations thereof.

Other aspects of the present disclosure are drawn to a non-transitory, computer-readable media having computer-readable instructions stored thereon, the computer-readable instructions being capable of being read by a client device with a first network device, a second network device, an external server, the first network device being configured to communicate with the external server, the second network device being configured to communicate with the external server. The computer-readable instructions are capable of instructing the client device to perform the method including onboarding, via a processor configured to execute instruction stored on a memory, onto the first network device using a first password and generating, via the processor, a key. The client device will also encrypt, via the processor, the password using the generated key, and store, via the processor, first association information in the external server, the first association information including client device identifying data to uniquely identify the client device, first network device identifying data to uniquely identify the first network device, the key and the encrypted password. Further, the client device will onboard, via the processor, the second network device using the first password and store, via the processor, second association information in the external server, the second association information including the client device identifying data, and second network device identifying data to uniquely identify the second network device.

In some embodiments, the non-transitory, computer-readable media, wherein the computer-readable instructions are capable of instructing the client device to perform the method wherein the generating the key includes generating the key based on client device information of the client device and first network device information of the first network device.

In some embodiments, the non-transitory, computer-readable media, wherein the computer-readable instructions are capable of instructing the client device to perform the method wherein the computer-readable instructions are capable of instructing the client device to perform the method wherein the client device identifying data is selected from a group of types of data consisting of an email address of a user of the client device, a phone number of the client device, a MAC address of the client device, and combinations thereof.

BRIEF SUMMARY OF THE DRAWINGS

The accompanying drawings, which are incorporated in and form a part of the specification, illustrate example embodiments and, together with the description, serve to explain the principles of the present disclosure. In the drawings:

FIG. 1 illustrates a conventional method for onboarding a new network device at a time to;

FIG. 5 illustrates a non-limiting example of a lookup table (LUT) that is stored in the memory of the external server as shown in FIG. 4.

DETAILED DESCRIPTION

In some conventional wireless networks, a user's device (or client device, e.g., a phone, laptop, tablet, etc.), may require the user to create an account either in an external server or locally in the device using an email address and password to manage a network device, such as a router or gateway device. Currently there are two different ways available to manage the network device. These will be described in greater detail with reference to FIG. 1.

Figure 1:
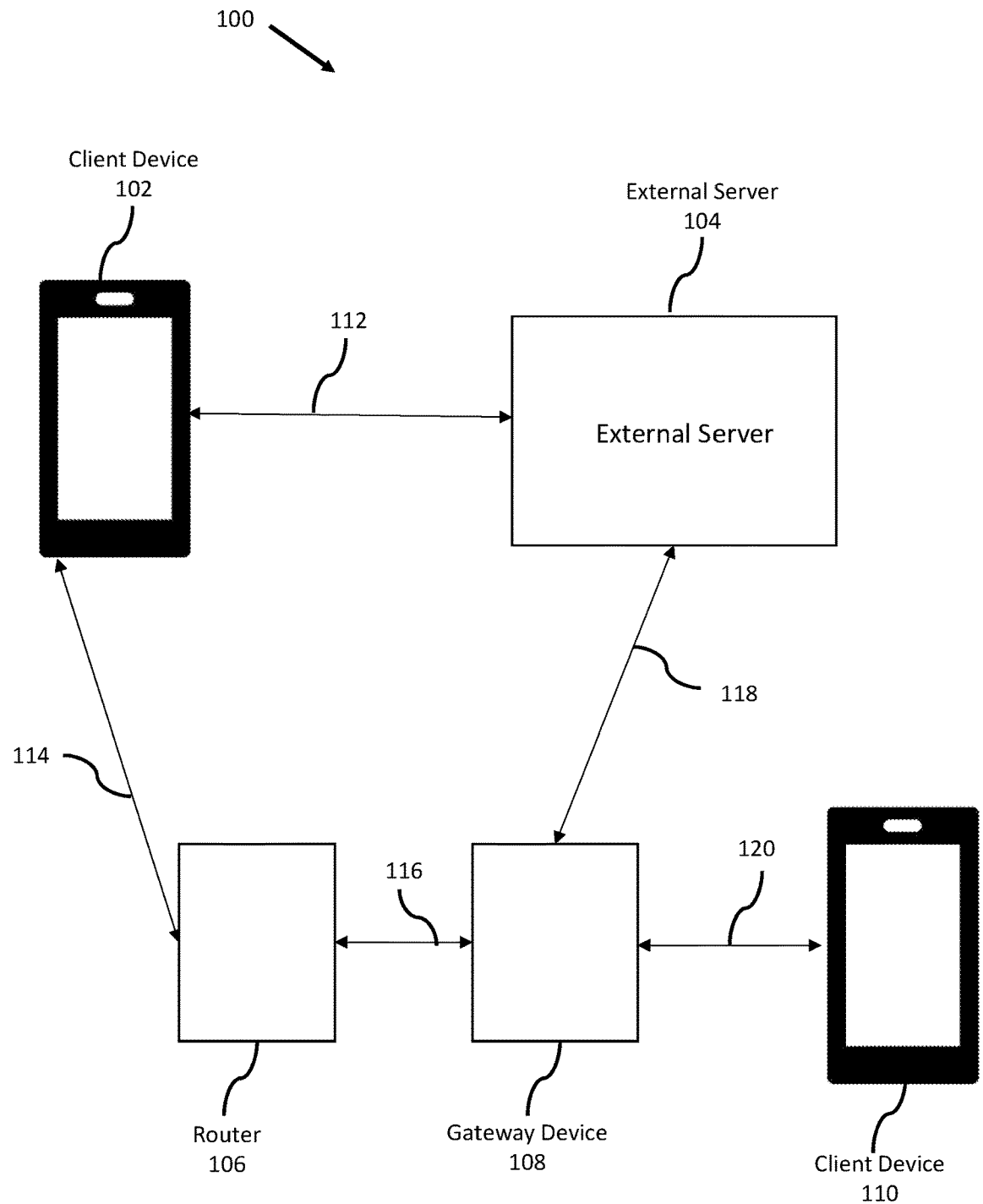

FIG. 1 illustrates a conventional method 100 for onboarding a new network device at a time to.

As shown in the figure, method 100 includes a client device 102, an external server 104, a router 106, a gateway device 108, and a client device 110.

Client device 102 is configured to communicate with external server 104 via communication channel 112, and client device 102 is also configured to communicate with router 106 via communication channel 114. Router 106 is configured to communicate with external server 104 via communication channel 116. Gateway device 108 is configured to communicate with external server 104 via a physical media/wiring 118, such as a coaxial network, an optical fiber network, and/or DSL, or wireless network, such as a satellite or terrestrial antenna implemented network or a combination of any of these examples or their equivalents, and gateway device 108 is also configured to communicate with client device 110 via a wireless communication channel 120.

The first conventional way includes using client device 102 to auto-generating a single sign on (SSO) password to both manage a user account in external server 104 and to manage router 106 in the user's premises. The SSO password is used in a secure way to help communicate with external server 104 and in turn helps in the credential management especially during recovery mechanisms. This auto generated password is stored in client device 102 and subsequently used for the auto login to router 106 either locally or remotely via local communication agent module of router 106.

The second conventional way to manage a network device includes using client device 110 to create a user generated password as login credentials for managing the configuration of gateway device 108. In particular, client device 110 may prompt a user to pick a single sign on (SSO) password to both manage a user account in external server 104 and to manage gateway device 108 in the user's premises. The user-chosen SSO password is used in a secure way to help communicate with external server 104 and in turn helps in the credential management especially during recovery mechanisms. This user created password is stored in client device 110 and subsequently used for the auto login to gateway device 108 either locally or remotely via local communication agent module of gateway device 108.

What is needed is a system and method for managing multiple network devices using a single client device. Therefore, the client device needs to have a mechanism to configure or manage multiple network devices using a single user account.

A system and method in accordance with the present disclosure manages multiple network devices using a single client device. Further, in a system and method in accordance with the present disclosure, the client device includes a mechanism to configure or manage multiple network devices using a single user account.

A system and method in accordance with the present disclosure uses an encryption key stored in a network device to encrypt the SSO password. This encrypted password is then stored in an external server for password recovery mechanisms. If password recovery is needed, the encrypted password is retrieved from the external server and is then decrypted using the encryption key. This aspect utilizes user managed passwords for authentication and does not use any form of encryption key during normal network operation. Accordingly, during normal network operation, there is no need for an encrypted password.

It should be noted that the password generation steps, password storage, and password recovery mechanisms conventionally used for different network devices were respectively different. However, in accordance with aspects of the present disclosure, all network devices within a network of a single user account use a single password generation, a single password storage, and a single password recovery mechanism.

Some benefits of the invention include that the user will be able to manage the existing network devices with the single account in the client device as well as with single account management. Further, multiple products can be added to be supported under one single account, making it cost effective. Additionally, a system in accordance with aspects of the present disclosure will decrease confusion to the user with multiple applications serving different purposes for each network device. It will also be beneficial to provide external server solutions that are accessible from a single client device in order to enhance and improve features rather than supporting multiple mobile application versions. Also, the aspects of the present disclosure may be managed remotely as configurations of network devices may be stored in the external server database. Finally, subsequent client device onboarding may be performed outside the home network.

An example system and method for management of passwords for network devices in accordance with aspects of the present disclosure will now be described in greater detail with reference to FIGS. 2-5.

Figure 2:
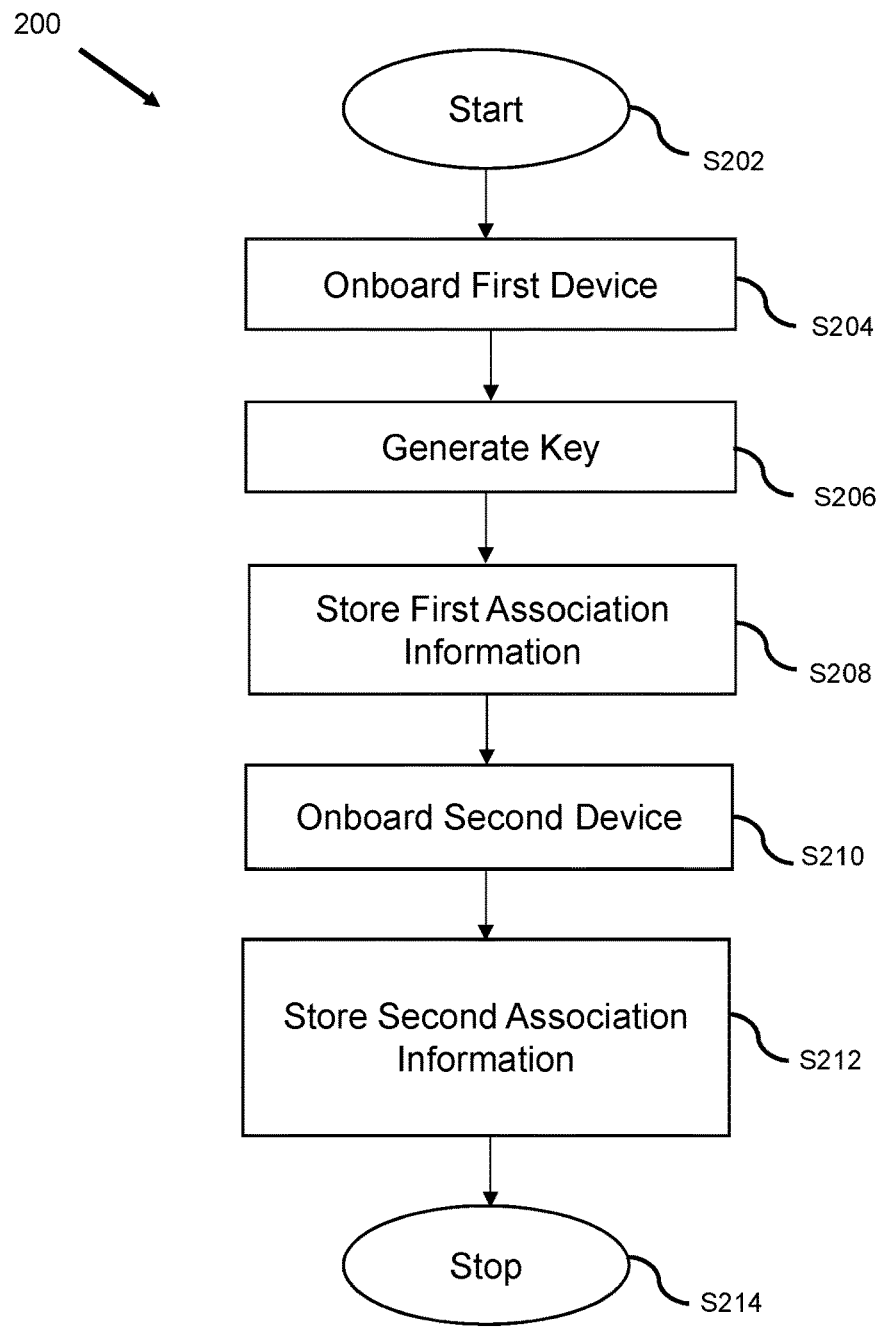
FIG. 2 illustrates an algorithm 200 to be executed by a processor for onboarding a new network device in accordance with aspects of the present disclosure.

FIG. 2 illustrates an algorithm 200 to be executed by a processor for onboarding a new network device in accordance with aspects of the present disclosure.

As shown in the figure, algorithm 200 starts (S202), and the first device is onboarded (S204). This will be described in greater detail with reference to FIGS. 3-5.

Figure 3:
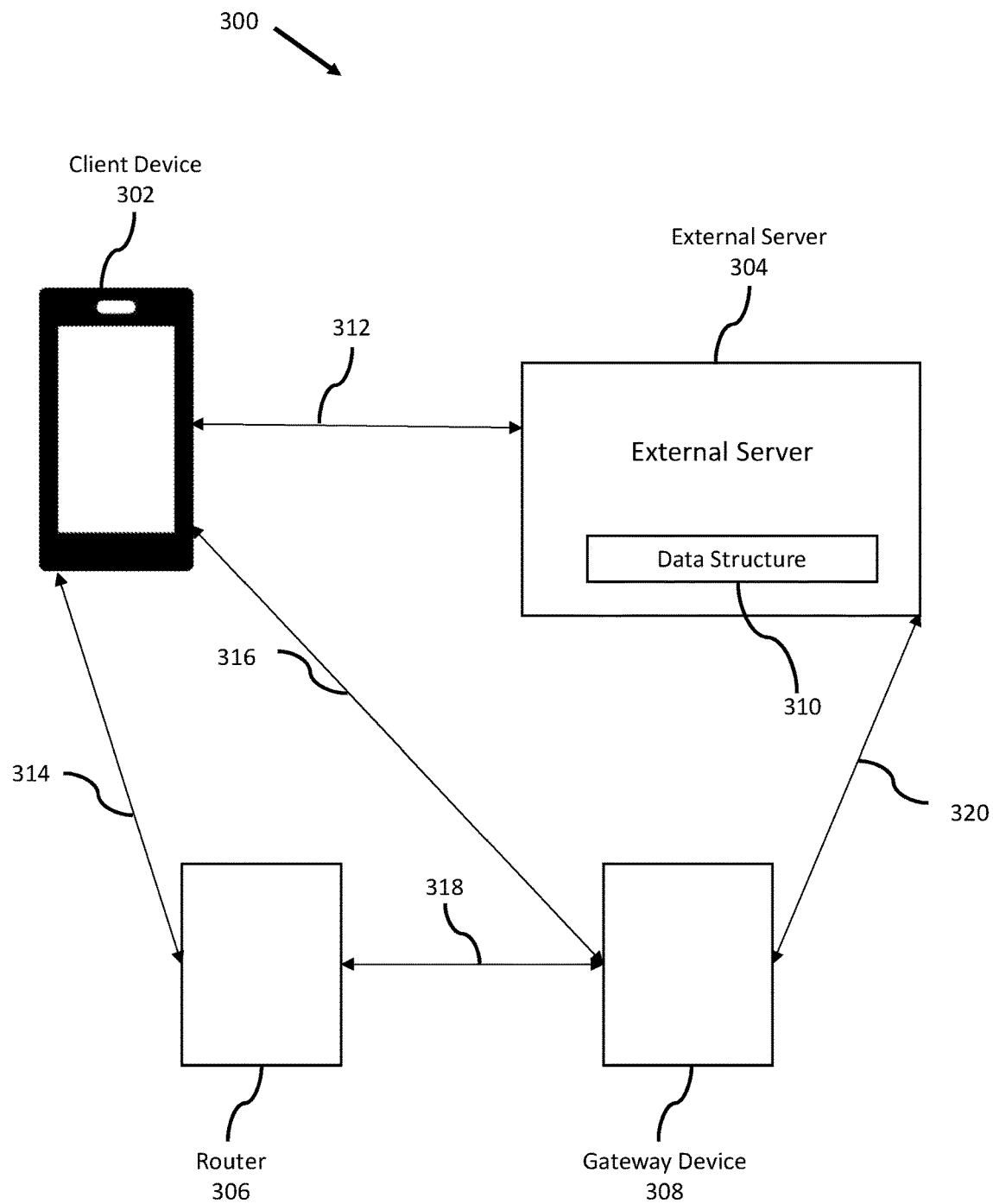
FIG. 3 illustrates the onboarding of a new network device in accordance with aspects of the present disclosure at a time $t_1$.

FIG. 3 illustrates a system 300 in accordance with aspects of the present disclosure at a time $t_1$.

As shown in the figure, system 300 includes a client device 302, an external server 304 having a data structure 310 stored therein, a router 306, and a gateway device 308.

Client device 302 is configured to communicate with external server 304 via a communication channel 312, and client device 302 is also configured to communicate with router 306 via a communication channel 314. Router 306 is configured to communicate with external server 304 via a communication channel 318. Gateway device 308 is configured to communicate with client device 302 via communication channel 316, and gateway device 308 is also configured to communicate with external server 304 via a physical media/wiring 320, such as a coaxial network, an optical fiber network, and/or DSL, or wireless network, such as a satellite or terrestrial antenna implemented network or a combination of any of these examples or their equivalents.

Figure 4:
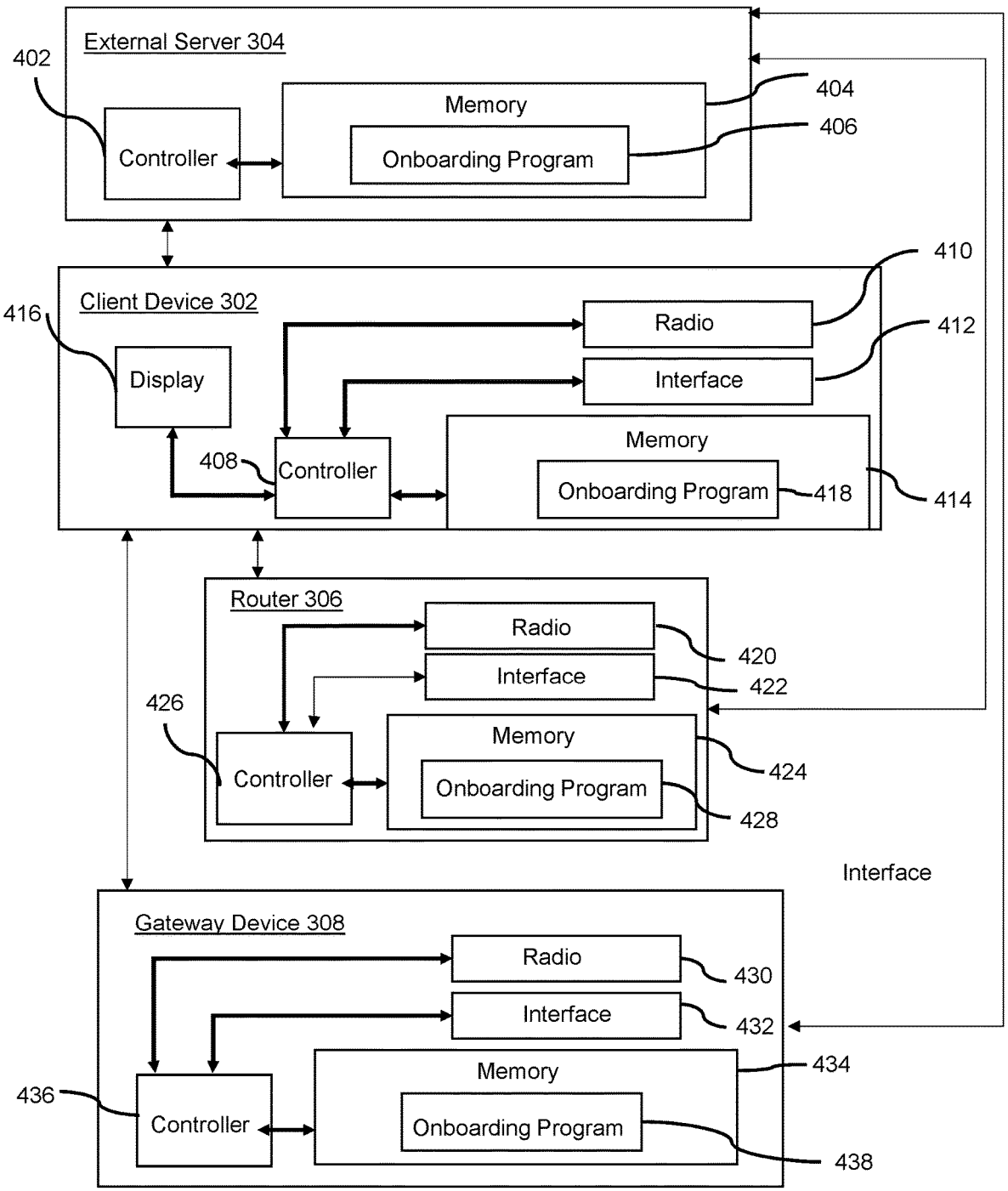
FIG. 4 illustrates an exploded view of the client device, the external server, the router, and the gateway device of FIG. 3.

FIG. 4 illustrates an exploded view of client device 302, external server 304, router 306, and gateway device 308 of FIG. 3.

As shown in the figure, external server 304 includes: a controller 402; and a main memory 404, which has stored therein an onboarding program 406.

In this example, controller 402, and memory 404 are illustrated as individual devices. However, in some cases, controller 402, and memory 404 may be combined as a unitary device. Further, in some cases, at least one of controller 402 and memory 404 may be implemented as a computer having tangible computer-readable media for carrying or having computer-executable instructions or data structures stored thereon. A non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from, and write information to the tangible computer-readable media. In the alternative, the tangible computer-readable media may be integral to the processor. The processor and the tangible computer-readable media may reside in an integrated circuit (IC), an application specific integrated circuit (ASIC), or large scale integrated circuit (LSI), system LSI, super LSI, or ultra LSI components that perform a part or all of the functions described herein. In the alternative, the processor and the tangible computer-readable media may reside as discrete components.

Example tangible computer-readable media may also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules maybe located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Controller 402, can be a hardware processor, such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of external server 304 in accordance with the embodiments described in the present disclosure.

Memory 404 can store various programming, and user content, and data including onboarding program 406. Onboarding program 406 includes instructions, that when executed by controller 402 enables external server 304 to enable onboarding of gateway device 308.

Client device 302 includes: a controller 408, a radio 410, an interface circuit 412, a memory 414 with an onboarding program 418 stored within, and a display 416.

In this example, controller 408, memory 414, radio 410, interface circuit 412 and display 416 are illustrated as individual devices. However, in some cases, at least two of controller 408, memory 414, radio 410, interface circuit 412 and display 416 may be combined as a unitary device. Further, in some cases, at least one of controller 408 and memory 414 may be implemented as a computer having tangible computer-readable media for carrying or having computer-executable instructions or data structures stored thereon.

Controller 408, can be a hardware processor, such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of client device 302 in accordance with the embodiments described in the present disclosure.

Memory 414 can store various programming, and user content, and data including onboarding program 418. As will be described in greater detail below, in some embodiments, onboarding program 418 may include instructions to be executed by controller 408 to cause client device 302 to: onboard onto the first network device using a first password; generate a key; encrypt the password using the generated key; store first association information in the external server; onboard the second device using the first password; and store second association information in the external server.

In some embodiments, as will be discussed in greater detail below, onboarding program 418 may include instructions to be executed by controller 408 to additionally cause client device 302 to: generate the key based on client device 302 information of client device 302 and first network device information of the first network device.

In some embodiments, as will be discussed in greater detail below, client device 302 identifying data is selected from a group of types of data consisting of an email address of a user of client device 302, a phone number of client device 302, a MAC address of client device 302, and combinations thereof.

Interface circuit 412 can include one or more connectors, such as RF connectors, or Ethernet connectors, and/or wireless communication circuitry, such as 5G circuitry and one or more antennas. Interface circuit 412 enables a user (not shown) to interface with controller 408 to manually operate or configure client device 302. Interface circuit 412 further enables controller 408 to decode communication signals received by radio 410 from either gateway device 308 or router 306 and to encode communication signals to be transmitted by radio 410 to either gateway device 308 or router 306.

Radio 410, may include a Wi-Fi WLAN interface radio transceiver that is operable to communicate with router 306 and with gateway device 308, as shown in FIG. 3 and also may include a cellular transceiver operable to communicate with a cellular service provider (not shown) through a cellular network. Radio 410 includes one or more antennas and communicates wirelessly via one or more of the 2.4 GHz band, the 5 GHz band, 6 GHz band, and the 60 GHz band, or at the appropriate band and bandwidth to implement the Wi-Fi 4, 5, 6, or 6E protocols. Client device 302 can also be equipped with a radio to implement a Bluetooth interface radio transceiver and antenna, which communicates wirelessly in the ISM band, from 2.400 to 2.485 GHz. As an alternative, at least one of the radios can be a radio meeting a Radio Frequency for Consumer Electronics (RF4CE) protocol, ZigBee protocol, and/or IEEE802.15.4 protocol, which also communicates in the ISM band.

Insofar as gateway device 308 provides connection to external server 304, such as a multiple systems operator (MSO), gateway device 308 can be equipped with connectors to connect with a television or display device, and can also include programming to execute an electronic program guide and/or other suitable graphical user interface (GUI), and can with such configuration be referred to as a so called set top box. Such a set top box can be included in the system shown in FIG. 3 as gateway device 308 or in addition thereto. Moreover, inclusion of one or more of far-field microphones, (for e.g., voice command and/or presence recognition, and/or telephone communication), cameras, (for e.g., gesture and/or presence recognition, and/or video telephone communication), and speakers, and associated programming, can enable the gateway device to be a so called smart media device.

Router 306 includes: a controller 426; an interface circuit 422; a memory 424, which has stored therein an onboarding program 428; and at least one radio, a sample of which is illustrated as a radio 420. It should be noted that additional Wi-Fi extenders, have similar structure and operation to that of router 306.

In this example, controller 426, memory 424, interface circuit 422, and radio 420 are illustrated as individual devices. However, in some cases, at least two of controller 426, memory 424, and radio 420 may be combined as a unitary device. Further, in some cases, at least one of controller 426 and memory 424 may be implemented as a computer having tangible computer-readable media for carrying or having computer-executable instructions or data structures stored thereon.

Controller 426, can be a hardware processor, such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of router 306 in accordance with the embodiments described in the present disclosure.

Memory 424 can store various programming, and user content, and data including onboarding program 428. Onboarding program 428 includes instructions, that when executed by router 306 enables router 306 to onboard onto gateway device 308.

Interface circuit 422 can include one or more connectors, such as RF connectors, or Ethernet connectors, and/or wireless communication circuitry, such as 5G circuitry and one or more antennas. Interface circuit 422 enables a user (not shown) to interface with controller 426 to manually operate or configure router 306. Interface circuit 422 further enables controller 426 to decode communication signals received by radio 420 from either gateway device 308 or client device 302 and to encode communication signals to be transmitted by radio 420 to either gateway device 308 or client device 302.

Radio 420, such as a Wi-Fi WLAN interface radio transceiver, is operable to communicate with client device 302, as shown in FIG. 3. Radio 420 includes one or more antennas and communicates wirelessly via one or more of the 2.4 GHz band, the 5 GHz band, 6 GHz band, and the 60 GHz band, or at the appropriate band and bandwidth to implement the Wi-Fi 4, 5, 6, or 6E protocols. Router 306 can also be equipped with a radio to implement a Bluetooth interface radio transceiver and antenna, which communicates wirelessly in the ISM band, from 2.400 to 2.485 GHz. As an alternative, at least one of the radios can be a radio meeting a Radio Frequency for Consumer Electronics (RF4CE) protocol, ZigBee protocol, and/or IEEE802.15.4 protocol, which also communicates in the ISM band.

As shown in the figure, gateway device 308 includes: a controller 436, a memory 434, which has stored therein an onboarding program 438; at least one radio, a sample of which is illustrated as a radio 430; and an interface circuit 432.

In this example, controller 436, memory 434, radio 430, and interface circuit 432 are illustrated as individual devices. However, in some cases, at least two of controller 436, memory 434, radio 430 and interface circuit 432 may be combined as a unitary device. Whether as individual devices or as combined devices, controller 436, memory 434, radio 430, and interface circuit 432 may be implemented as any combination of an apparatus, a system and an integrated circuit. Further, in some cases, at least one of controller 436, memory 434, and interface circuit 432 may be implemented as a computer having a non-transitory computer-readable recording medium.

Controller 436 can be a hardware processor, such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of gateway device 308 in accordance with the embodiments described in the present disclosure.

Memory 434 can store various programming, and user content, and data including onboarding program 438. Onboarding program 438 includes instructions, that when executed by controller 436 enables gateway device 308 to enable router 306 to onboard onto gateway device 308.

Interface circuit 432 can include one or more connectors, such as RF connectors, or Ethernet connectors, and/or wireless communication circuitry, such as 5G circuitry and one or more antennas. Interface circuit 432 receives content from service external server 304 (as shown in FIG. 3) by known methods, non-limiting examples of which include terrestrial antenna, satellite dish, wired cable, DSL, optical fibers, or 5G as discussed above. Through interface circuit 432, gateway device 308 receives an input signal, including data and/or audio/video content, from external server 304 and can send data to external server 304.

Radio 430 (and preferably two or more radios), may also be referred to as a wireless communication circuit, such as a Wi-Fi WLAN interface radio transceiver and is operable to communicate with client device 302 and with router 306. Radio 430 includes one or more antennas and communicates wirelessly via one or more of the 2.4 GHz band, the 5 GHz band, 6 GHz band, and the 60 GHz band, or at the appropriate band and bandwidth to implement the Wi-Fi 4, 5, 6, or 6E protocols. Gateway device 308 can also be equipped with a radio to implement a Bluetooth interface radio transceiver and antenna, which communicates wirelessly in the ISM band, from 2.400 to 2.485 GHz. As an alternative, at least one of the radios can be a radio meeting a Radio Frequency for Consumer Electronics (RF4CE) protocol, ZigBee protocol, and/or IEEE802.15.4 protocol, which also communicates in the ISM band.

Consider the following situation, a user has purchased gateway device 308 that they would like to connect e.g., onboard, to create a wireless network to gain access to external server 304. After unboxing gateway device 308 and turning it on, client device 302 may instruct gateway device 308 to onboard using a device ID, SSID, etc. Gateway device 308 establishes a connection to external server 304 through physical media/wiring 320 and through a service provider for client device 302. Client device 302 may instruct gateway device 308 to initiate the onboarding process. It should be noted that a gateway device is discussed here as a non-limiting example device, however any known network device may be used in aspects of the present disclosure.

Returning to FIG. 2, once the first device is onboarded (S204), then a key is generated (S206). Any known method may be used to generate a key. In non-limiting example embodiment, information related to client device 302 and information related to the onboarding device, which in this example is gateway device 308, is used to generate the key. For example, the key may be generated using a serial number associated with client device 302, which is stored in memory 414, as well as a serial number associated with gateway device 308, which is stored in memory 434. This will be described in greater detail with reference to FIG. 5.

FIG. 5 illustrates a non-limiting example of a LUT 500 that is stored in memory 404 of external server 304 as shown in FIG. 4.

As shown in the figure, LUT 500 includes a client ID column 502, a device ID column 504, a key column 506, an encrypted password column 508, and a decrypted password column 510. LUT 500 also includes a row 512, a row 514, a row 516, a row 518, a row 520, a row 524, a row 526, and a row 528.

In LUT 500, let Client Device 1 of column 502 and row 514 correspond to client identification data for client device 302. In this example, the generated key for gateway device 308 is shown in LUT 500, under key column 506 in row 514 as A1skjfa.

Returning to FIG. 2, once a key is generated (S206), then first association information is stored (S208). First association information may include client device identifying data to uniquely identify the client device, non-limiting examples of which include a device name, a MAC address, a phone number, an email address, and combinations thereof.

As shown in FIG. 3, external server 304 stores client device identifying data to uniquely identify client device 302 in data structure 310. For example as shown in FIG. 5, in column 502 of LUT 500, the entry "Client Device 1" is merely a representation data that may be stored to uniquely identify client device 302. As mentioned above, the actual data may be a name of client device 302, a MAC address of client device 302, a phone number of client device 302 in the event that client device 302 is a phone, an email address of client device 302, and combinations thereof. This association information associates gateway device 308 to client device 302, by way of associating the device identification of gateway device 308 listed in column 504 and row 514 to the client device identification of client device 302 listed in column 502 and row 514.

Returning to FIG. 2, once first association information is stored (S208), then the second device is onboarded (S210). For example, consider the situation that gateway device 308 has now been onboarded and is up and running. The user of client device 302 then purchases router 306 and wants to onboard router 306 onto gateway device 308. When router 306 is subsequently onboarded, the key is provided from gateway device 308. Router 306 may be onboarded by any known method including the method discussed above with reference to onboarding gateway device 308.

Returning to FIG. 2, once the second device is onboarded (S210), then the second association information is stored (S212). For example, second association information is similar to what was discussed previously in reference to first association information in S208, however this time it is data to uniquely identify router 306. As shown in LUT 500 of FIG. 5, let the association information that uniquely identifies router 306 be represented by "APD 1" in column 504 and row 516. In this case, association information associates router 306 to client device 302, by way of associating the device identification of router 306 listed in column 504 and row 516 to the client device identification of client device 302 listed in column 502 and row 514.

It should be also noted that the key for router 306 is "A1skjfa" as shown in column 506, row 516, which is the same key for gateway device 308 as shown in column 506, row 514. Further, it should be also noted that the encrypted password for router 306 is "hUd4@qN" as shown in column 508, row 516, which is the same encrypted password for gateway device 308 as shown in column 508, row 514.

Returning to FIG. 2, once the second association information is stored (S212), then the algorithm stops (S214).

In the example algorithm 200 discussed above, two network devices were onboarded. However, these two are discussed merely for purposes of illustration, wherein any number of network devices may be onboarded and associated with client device 302. In such cases, each subsequently onboarded network device, e.g., each subsequently added access point device (APD) will additionally have its respective association information stored in memory 404 of external server 304.

For example returning to FIG. 5, let APD 2 in column 504 and row 518 be association information that uniquely identifies a subsequent APD that is onboarded to router 306, and let "APD 3" in column 504 and row 518 be association information that uniquely identifies another subsequent APD that is onboarded to router 306. As noted in LUT 500 all devices associated with client device 302, represented in LUT 500 by Client Device 1 as shown in column 502 and row 514, share the same key "A1skjfa" and the same encrypted password "hUd4@qn." Column 510 indicates the corresponding decrypted "LifeIsCool," for encrypted password "hUd4@qn." Column 510 is shaded to indicate that this column is not actually in LUT 500, as the decrypted password is not stored in memory 404 of external server 304. On the contrary, as mentioned above, only the encrypted password is stored, which may be provided to client device 302, or any associated devices, which would decrypt the encrypted password using the key.

Further, algorithm 200 may be executed by different client devices in different residences. For example, as shown in FIG. 5, LUT 500 includes an entry for "Client Device 2" in column 502 and row 522. The entry "Client Device 2" is merely a representation data that may be stored to uniquely identify another client device. As mentioned above, the actual data may be a name of the client device, a MAC address of the client device, a phone number of the client device in the event that the client device is a phone, an email address of the client device, and combinations thereof. Association information associates a gateway device identified as "GW 2" in column 504 and row 522 to the client device. Similarly, association information associates an APD identified as "APD 4" in column 504 and row 524 to the client device. Further, association information associates an APD identified as "APD 5" in column 504 and row 526 to the client device.

Further, as mentioned above with reference to the network including client device 302, in this example, all the network devices associated with "Client Device 2" have a similar key "Ods4ion" and the same encrypted password "Afka6wU%." It should be noted in this example, that the decrypted password, as shown in column 510 and rows 522, 524 and 526, is "Br7he #IpX." For purposes of discussion let "Br7he #IpX" be a pseudo-randomly generated password. In this light, in accordance with aspects of the present disclosure, the first network device to be onboarded with the client device corresponding client identification "Client Device 2" is the gateway identified as "GW 2" in column 504 and row 522. In this case, when the gateway is onboarded, the password used for the onboarding procedure was pseudo-randomly generated. However, this pseudo-randomly generated password is then shared and used for each subsequent network device that is onboarded onto the network used by the client device corresponding to client identification "Client Device 2." In this example, the subsequent network devices to be onboarded are the APDs corresponding the device ID "APD 4" and device ID "APD 5."

LUT 500 additionally includes an entry for "Client Device 3" in column 502 and row 528. The entry "Client Device 3" is merely a representation data that may be stored to uniquely identify yet another client device. As mentioned above, the actual data may be a name of the client device, a MAC address of the client device, a phone number of the client device in the event that the client device is a phone, an email address of the client device, and combinations thereof. Association information associates a gateway device identified as "GW 3" in column 504 and row 528 to the client device.

In conventional network systems, each newly onboarded network device may require its own respective password. Maintaining each of these passwords in a secure fashion increases the complexity of operation for a single client device that may manage the onboarding of these network devices.

In accordance with aspects of the present disclosure, after a first network device is onboarded by a client device, the password used to onboard the first network device by the client device is used to onboard each subsequent network device. Each of these network devices are associated with the client device that is used to onboard them onto the network. Further, an encrypted form of the password is stored in an external server and may be accessed by each network device in the event that retrieval of the password is required. Still further, each network device that is associated with the client device is provided with a key that is used to decrypt the encrypted form of the password that may be retrieved from the external server to generate the decrypted password to complete a re-onboarding process if needed. This system simplifies the operations needed for a single client device to manage the onboarding of a plurality of network devices.

The foregoing description of various preferred embodiments have been presented for purposes of illustration and description. It is not intended to be exhaustive or to limit the present disclosure to the precise forms disclosed, and obviously many modifications and variations are possible in light of the above teaching. The example embodiments, as described above, were chosen and described in order to best explain the principles of the present disclosure and its practical application to thereby enable others skilled in the art to best utilize the present disclosure in various embodiments and with various modifications as are suited to the particular use contemplated. It is intended that the scope of the present disclosure be defined by the claims appended hereto.

What is claimed is:

1. A client device for use with a first network device, a second network device, and an external server, said client device comprising:
 a memory; and
 a processor configured to execute instructions stored on said memory to cause said client device to:
  onboard onto the first network device using a first password;
  generate a key;
  encrypt the password using the generated key;
  store first association information in the external server, the first association information including client device identifying data to uniquely identify said client device, first network device identifying data to uniquely identify the first network device, the key and the encrypted password;

onboard the second network device using the first password; and store second association information in the external server, the second association information including the client device identifying data, and second network device identifying data to uniquely identify the second network device.

2. The client device of claim 1, wherein said processor is further configured to execute instructions stored on said memory to cause said client device to generate the key based on client device information of said client device and first network device information of the first network device.

3. The client device of claim 1, wherein the client device identifying data is selected from a group of types of data consisting of an email address of a user of said client device, a phone number of said client device, a MAC address of said client device, and combinations thereof.

4. A method of using a client device with a first network device, a second network device, and an external server, said method comprising:

onboarding, via a processor configured to execute instruction stored on a memory, onto the first network device using a first password;

generating, via the processor, a key;

encrypting, via the processor, the password using the generated key;

storing, via the processor, first association information in the external server, the first association information including client device identifying data to uniquely identify the client device, first network device identifying data to uniquely identify the first network device, the key and the encrypted password;

onboarding, via the processor, the second network device using the first password; and storing, via the processor, second association information in the external server, the second association information including the client device identifying data, and second network device identifying data to uniquely identify the second network device.

5. The method of claim 4, wherein said generating the key comprises generating the key based on client device information of the client device and first network device information of the first network device.

6. The method of claim 5, wherein the client device identifying data is selected from a group of types of data consisting of an email address of a user of the client device, a phone number of the client device, a MAC address of the client device, and combinations thereof.

7. A non-transitory, computer-readable media of a client device for use with a first network device, a second network device, and an external server, the non-transitory, computer-readable media having computer-readable instructions stored thereon, wherein the computer-readable instructions when executed by a processor of the client device cause the client device to perform one or more operations comprising:

onboarding configured to execute instruction stored on a memory, onto the first network device using a first password;

generating a key;

encrypting the password using the generated key;

storing first association information in the external server, the first association information including client device identifying data to uniquely identify the client device, first network device identifying data to uniquely identify the first network device, the key and the encrypted password;

onboarding the second network device using the first password; and storing second association information in the external server, the second association information including the client device identifying data, and second network device identifying data to uniquely identify the second network device.

8. The non-transitory, computer-readable media of claim 7, wherein said generating the key comprises generating the key based on client device information of the client device and first network device information of the first network device.

9. The non-transitory, computer-readable media of claim 8, wherein the client device identifying data is selected from a group of types of data consisting of an email address of a user of the client device, a phone number of the client device, a MAC address of the client device, and combinations thereof.

* * * * *